United States Patent
Chang et al.

(10) Patent No.: US 12,284,610 B2
(45) Date of Patent: Apr. 22, 2025

(54) USER EQUIPMENT, BASE STATION, AND METHOD FOR HANDLING WAKE-UP SIGNALS

(71) Applicant: SHARP KABUSHIKI KAISHA, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 656 days.

(21) Appl. No.: 17/311,483

(22) PCT Filed: Dec. 6, 2019

(86) PCT No.: PCT/CN2019/123644
§ 371 (c)(1),
(2) Date: Jun. 7, 2021

(87) PCT Pub. No.: WO2020/114483
PCT Pub. Date: Jun. 11, 2020

(65) Prior Publication Data
US 2022/0095226 A1    Mar. 24, 2022

(30) Foreign Application Priority Data
Dec. 7, 2018   (CN) .......................... 201811500293.4

(51) Int. Cl.
*H04W 52/02*   (2009.01)
*H04W 68/02*   (2009.01)

(52) U.S. Cl.
CPC ... *H04W 52/0229* (2013.01); *H04W 52/0219* (2013.01); *H04W 68/02* (2013.01)

(58) Field of Classification Search
CPC . H04W 52/0219; H04W 52/028; H04W 4/70; H04W 4/025; H04W 52/0232;
(Continued)

(56) References Cited

U.S. PATENT DOCUMENTS

| | | | |
|---|---|---|---|
| 2012/0275364 A1 | 11/2012 | Anderson et al. | |
| 2012/0275365 A1 | 11/2012 | Anderson et al. | |

(Continued)

FOREIGN PATENT DOCUMENTS

| | | |
|---|---|---|
| CN | 103636264 A | 3/2014 |
| CN | 108668359 A | 10/2018 |
| WO | 2018/175760 A1 | 9/2018 |

OTHER PUBLICATIONS

Ericsson, "Wake Up Signal", R2-1804962, 3GPP TSG-RAN2 Meeting #101bis Sanya, China, Apr. 16-20, 2018.
(Continued)

*Primary Examiner* — Fred A Casca
(74) *Attorney, Agent, or Firm* — ScienBiziP, P.C.

(57) ABSTRACT

The present disclosure provides a method executed by a user equipment (UE) comprising: receiving a UE grouping-based wake-up signal (WUS) configuration from a base station; determining, by the UE supporting a UE grouping-based WUS function, a plurality of WUSs associated with a UE group to which the UE belongs according to the received WUS configuration; monitoring the plurality of WUSs; and skipping monitoring other WUSs of the plurality of WUSs when the UE successfully detects, for a paging occasion (PO), one of the plurality of WUSs.

10 Claims, 3 Drawing Sheets

(58) Field of Classification Search
CPC ......... H04W 72/0446; H04W 72/0453; H04W 72/23; H04W 52/0229; H04W 52/0216; H04W 52/0235; Y02D 30/70
See application file for complete search history.

(56) References Cited

U.S. PATENT DOCUMENTS

| | | | |
|---|---|---|---|
| 2012/0275366 A1 | 11/2012 | Anderson et al. | |
| 2018/0317218 A1* | 11/2018 | Li | H04W 72/1268 |
| 2019/0349856 A1* | 11/2019 | Liu | H04W 52/0216 |
| 2020/0029303 A1 | 1/2020 | Liu et al. | |
| 2020/0107267 A1* | 4/2020 | Wu | H04W 76/28 |
| 2020/0351779 A1* | 11/2020 | Sharma | H04W 36/08 |
| 2020/0359323 A1* | 11/2020 | Beale | H04J 13/0062 |
| 2020/0367168 A1* | 11/2020 | Hwang | H04W 52/0229 |

OTHER PUBLICATIONS

Nokia et al., "UE-group wake-up signal for NB-IoT", R1-1811073, 3GPP TSG RAN WG1 Meeting #94bis Chengdu, China, Oct. 8-12, 2018.
LG Electronics, "Discussion on wake up signal configurations and procedures", R1-1804520, 3GPP TSG RAN WG1 Meeting #92bis Sanya, China, Apr. 16-20, 2018.
Nokia et al., "UE-group wake-up signal for NB-IoT", R1-1812928, 3GPP TSG RAN WG1 Meeting #95 Spokane, USA, Nov. 12-16, 2018.
Ericsson,Huawei,3GPP TSG RAN Meeting #80,RP-181451,"New WID on Rel-16 enhancements for NB-IoT",La Jolla, USA, Jun. 11-14, 2018.
Ericsson,3GPP TSG RAN Meeting #81,RP-181878,"Revised WID: Additional MTC enhancements for LTE",Gold Coast, Australia, Sep. 10-13, 2018.

* cited by examiner

USER EQUIPMENT, BASE STATION, AND METHOD FOR HANDLING WAKE-UP SIGNALS

CROSS-REFERENCE TO RELATED APPLICATIONS

This application is a national stage application of International Patent Application No. PCT/CN2019/123644, filed Dec. 6, 2019, which claims the benefit of priority to CN patent application No. 201811500293.4, filed Dec. 7, 2018. Each of these applications is incorporated herein by reference in its entirety.

FIELD

The present disclosure relates to the technical field of wireless communication, and more particularly, to a user equipment, a base station, and a method for handling wake-up signals.

BACKGROUND

A new R16 work item regarding further enhancement of NarrowBand Internet of Things (NB-IoT) (see RP-181451: New WID on R16 enhancement for NB-IoT) and a new R16 work item regarding further enhancement of Machine Type Communication (MTC) (see RP-181878: revised WID for additional MTC enhancement) were approved at the 3rd Generation Partnership Project (3GPP) RAN #80 plenary meeting held in Jun. 2018. One of the goals of these two work items is to improve the efficiency of downlink transmission to reduce energy consumption of a user equipment (UE), and one of the technical means is a UE grouping-based wake-up signal (WUS). In fact, the WUS has been standardized in a work item of the previous release (Release 15) to reduce the UE energy consumption caused by a UE to monitor a paging message in a radio resource control (RRC) idle state. Considering that there is no paging message in most paging occasions, the design idea of WUS is to send a relatively simple WUS before sending a paging message, and the UE just needs to receive the paging message in a corresponding paging occasion only after receiving the WUS. If a WUS is not received, the UE does not need to receive a paging message in the corresponding paging occasion, thereby avoiding unnecessary monitoring of a paging occasion without any paging message. In R16, the introduction of UE grouping-based WUS is expected to refine WUS granularity and further reduce the unnecessary energy consumption of the UE for monitoring a paging message.

The present disclosure mainly provides a solution to the problem of how to implement a UE grouping-based WUS, and more specifically, provides a solution for monitoring and sending a UE grouping-based WUS.

SUMMARY

The present disclosure is provided in order to solve at least some of the above-mentioned problems existing in the prior art. The present disclosure may provide a user equipment, a base station, and a method for handling a wake-up signal, in which the amount of the UE monitoring a WUS and energy consumption of the UE caused thereby may be reduced, and the base station may know whether the UE supports a UE grouping-based WUS function to be able to determine whether to use a UE grouping-based WUS to send a paging message in a paging procedure for the UE.

According to the present disclosure, a method executed by a user equipment (UE) is provided and comprises: receiving a UE grouping-based wake-up signal (WUS) configuration from a base station; determining, by the UE supporting a UE grouping-based WUS function, a plurality of WUSs associated with a UE group to which the UE belongs according to the received WUS configuration; monitoring the plurality of WUSs; and skipping monitoring other WUSs of the plurality of WUSs when the UE successfully detects, for a paging occasion (PO), one of the plurality of WUSs.

In one aspect of the method, the plurality of WUSs associated with the UE group includes one or more combinations of: one or more common WUSs, one or more group WUSs, and/or one or more group combination WUSs.

In one aspect of the method, the WUS configuration is included in system information.

In one aspect of the method, the UE monitors the plurality of WUSs according to priorities of the plurality of WUSs.

In one aspect of the method, the priorities of the plurality of WUSs are arranged from high to low in an order of a common WUS, a group combination WUS, and a group WUS.

In one aspect of the method, in a case that the plurality of WUSs includes a plurality of group combination WUSs, priorities of the plurality of group combination WUSs are arranged from high to low in an order of numbers of groups corresponding to the plurality of group combination WUSs from high to low.

In addition, according to the present disclosure, a method executed by a base station is provided and comprises: receiving a paging message for a user equipment (UE) from a core network node, the paging message including capability information for indicating whether the UE supports a UE grouping-based wake-up signal (WUS) function; and transmitting a WUS to the UE by using the UE grouping-based WUS function in a case that the capability information indicates that the UE supports the UE grouping-based WUS function.

In one aspect of the method, the core network node is a mobility management entity.

The present disclosure further provides a user equipment comprising: a processor; and a memory configured to store instructions, wherein the instructions, when executed by the processor, causes the UE to perform the previously disclosed method executed by the UE.

According to the present disclosure, the amount of a UE monitoring the WUS and energy consumption of the UE caused thereby may be reduced, and the base station may know whether the UE supports the UE grouping-based WUS function, to be able to determine whether to use UE grouping-based WUS to send a paging message in a paging procedure for the UE.

BRIEF DESCRIPTION OF THE DRAWINGS

The above and other features of the present disclosure will become more apparent with the following detailed description in conjunction with the accompanying drawings.

DETAILED DESCRIPTION OF THE PREFERRED EMBODIMENTS

Figure 1:
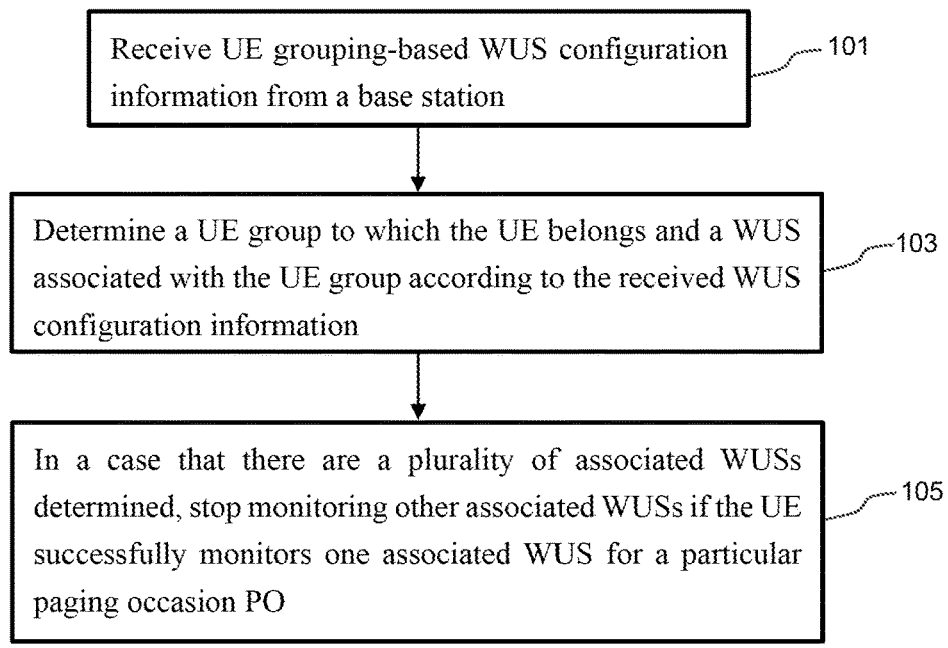
FIG. 1 illustrates a flowchart of a method executed by a user equipment according to an embodiment of the present disclosure.

The present disclosure will be described in detail with reference to the accompanying drawings and specific implementations.

In the present disclosure, the terms "comprise" and "include" and derivatives thereof mean inclusion without limitation; the term "or" may have an inclusive meaning and means "and/or."

In the present disclosure, the disclosed embodiments are merely illustrative, and should not be interpreted in any way as limiting the scope of the disclosure. The following disclosure with reference to the accompanying drawings is intended to facilitate a comprehensive understanding of exemplary embodiments of the present disclosure as defined by the claims and equivalents thereof. The following disclosure includes a variety of specific details to facilitate understanding, but these details should be considered merely exemplary. Therefore, those of ordinary skill in the art should recognize that various changes and modifications may be made to the disclosed embodiments without departing from the scope and spirit of the present disclosure. The disclosure of known functions and structures is omitted for clarity and simplicity. In addition, the same reference numerals are used for similar functions and operations throughout the present disclosure.

A plurality of embodiments according to the present disclosure are specifically based on adopting an NB-IoT in a Long Term Evolution (LTE) mobile communication system and its subsequent evolved versions as exemplary application environments. However, it should be noted that the present disclosure is not limited to the disclosed embodiments, but may be applied to other wireless communication systems, such as an Machine Type Communication (MTC) system, and may also be applied to a next-generation 5G wireless communication system New Radio (NR)).

The base station in the present disclosure may be any type of base station including a Node B, an evolved Node-B (eNB), a next generation Node-B (gNB) in a 5G communication system, a micro base station, a picocell base station, a macro base station, or a home base station. A cell may also be a cell covered by any type of disclosed base station. In the embodiments of the present disclosure, "indicate/indication" and "notify/notification" or "inform/information" may be interchanged. A UE may be an NB-IoT UE, a Bandwidth reduced Low complexity (BL) UE, or a UE in an enhanced coverage, or may be other UE such as a 5G NR UE. Different embodiments may also be combined.

Some concepts are introduced below.

Physical downlink control channel (PDCCH): May refer to a PDCCH in 3GPP LTE/LTE-A (Long Term Evolution/ Long Term Evolution-Advanced), an MPDCCH (MTC PDCCH) used for machine communication, an NPDCCH used for narrowband Internet of Things communication, an NR-PDCCH for NR (New Radio), which may also be referred to as 5G, or the like. The physical downlink shared channel may refer to a PDSCH (Physical Downlink Shared channel) in 3GPP Long Term Evolution/Long Term Evolution-Advanced (LTE/LTE-A), an NPDSCH used for narrowband Internet of Things communication, an NR-PDSCH, or the like.

Wake-up signal/channel: A physical signaling/channel that refers to a physical wake-up signal (WUS)/channel. The physical wake-up signaling/channel refers to a physical wake-up signaling/channel that needs to be detected or decoded by a UE staying in an idle mode or by a UE staying in a discontinuous reception (DRX) state in an RRC connected mode before the UE receives, detects, or decodes a physical downlink control channel and/or a physical downlink shared channel. If the physical wake-up signaling is detected or decoded, then a subsequent corresponding physical downlink control channel and/or a subsequent corresponding physical downlink shared channel are/is received, detected, or decoded. If the physical wake-up signaling/channel is not detected or not decoded, then a subsequent corresponding physical downlink control channel and/or a subsequent corresponding physical downlink shared channel are/is not detected or not decoded. In other words, a subsequent corresponding physical downlink control channel and/ or a subsequent corresponding physical downlink shared channel are/is ignored or skipped.

Paging Scheme in LTE:

In the 3GPP Rel-14 standard specification, the UE staying in an idle mode may use discontinuous reception to reduce power consumption. A paging occasion (PO) is a subframe, on which there may be a PDCCH, an MPDCCH, or an NPDCCH that is scrambled with a Paging-Radio Network Temporary Identifier (P-RNTI) and configured to schedule a paging message. In the case of an MTC Physical Downlink Control Channel (MPDCCH) scrambled with a P-RNTI, the PO refers to a starting subframe of MPDCCH repetitions. In the case of an NPDCCH scrambled with a P-RNTI, the PO refers to a starting subframe of NPDCCH repetitions unless the subframe determined by the PO is not a valid NB-IoT downlink subframe. When the subframe determined by the PO is not a valid NB-IoT downlink subframe, the first valid NB-IoT downlink subframe after the PO is the starting subframe of the NPDCCH repetitions.

A paging frame (PF) is one radio frame that may include one or more POs. When DRX is used, the UE only needs to monitor one PO per DRX cycle.

A paging narrowband (PNB) is one narrowband, on which the UE receives a paging message.

A PF, PO, and PNB are determined by the following formulas using DRX parameters provided in system information:

A PF is given by the following equation:

$$\text{System Frame Number (SFN)} \bmod T = (T \text{ div } N)^* (\text{UE\_ID} \bmod N) \qquad (1)$$

The PO may be obtained according to Table 1, Table 2, Table 3, or Table 4 by using an index i_s according to the duplex mode and system bandwidth. The index i_s is obtained by the following equation:

$$i\_s = \text{floor}(\text{UE\_ID}/N) \bmod Ns \qquad (2)$$

For FDD:

TABLE 1

(for a case where PDCCH or NPDCCH is scrambled by P-RNTI, or MPDCCH is scrambled with P-RNTI, and the system bandwidth is greater than 3 MHz)

| Ns | PO, i_s = 0 | PO, i_s = 1 | PO, i_s = 2 | PO, i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

(for a case where MPDCCH is scrambled by P-RNTI, and the system bandwidth is 1.4 MHz and 3 MHz)

| Ns | PO, i_s = 0 | PO, i_s = 1 | PO, i_s = 2 | PO, i_s = 3 |
|---|---|---|---|---|
| 1 | 5 | N/A | N/A | N/A |
| 2 | 5 | 5 | N/A | N/A |
| 4 | 5 | 5 | 5 | 5 |

For TDD (all uplink/downlink configurations):

TABLE 3

(for a case where PDCCH is scrambled by P-RNTI, or MPDCCH is scrambled with P-RNTI, and the system bandwidth is greater than 3 MHz)

| Ns | PO, i_s = 0 | PO, i_s = 1 | PO, i_s = 2 | PO, i_s = 3 |
|---|---|---|---|---|
| 1 | 0 | N/A | N/A | N/A |
| 2 | 0 | 5 | N/A | N/A |
| 4 | 0 | 1 | 5 | 6 |

TABLE 4

(for a case where MPDCCH is scrambled by P-RNTI, and the system bandwidth is 1.4 MHz and 3 MHz)

| Ns | PO, i_s = 0 | PO, i_s = 1 | PO, i_s = 2 | PO, i_s = 3 |
|---|---|---|---|---|
| 1 | 1 | N/A | N/A | N/A |
| 2 | 1 | 6 | N/A | N/A |
| 4 | 1 | 1 | 6 | 6 |

If the detected MPDCCH is scrambled by the P-RNTI, the paging narrowband (PNB) is determined by the following equation:

$$PNB = \mathrm{floor}(UE\_ID/(N*Ns)) \bmod Nn \quad (3)$$

If the detected NPDCCH is scrambled by the P-RNTI and the UE supports the reception of a paging message on a non-anchor carrier, and if configuration information of the paging message for the non-anchor carrier is provided in system information, then the paging carrier is determined by the smallest paging carrier n fulfilling the following equation (4):

$$\mathrm{floor}(UE\_ID/(N*Ns)) \bmod \sum_{j=0}^{j=(maxPagingCarriers-1)} \mathrm{Weight}[j] < \sum_{k=0}^{k=(n-1)} \mathrm{Weight}[k] \quad (4)$$

System information DRX parameters stored in the UE need to be updated locally in the UE whenever the DRX parameters are changed in the system information. If the UE has no International Mobile Subscriber Identity (IMSI), for example, if the UE needs to make an emergency call without a Universal Subscriber Identity Module (USIM), then the UE needs to use the default identity UE_ID=0 in the PF, i_s, and the disclosed PNB equations.

The following parameters are used for calculating the PF, i_s, PNB, and the NB-IoT paging carrier:

T: DRX cycle of the UE. Except for NB-IoT, if a higher layer configures a UE-specific extended DRX value of 512 radio frames, T=512. Otherwise, T is determined by the shortest DRX cycle of both a UE-specific DRX cycle (if allocated by a higher layer) and a default DRX cycle broadcast in system information. If a higher layer does not configure the UE-specific DRX cycle, a default DRX cycle is applied. The UE-specific DRX cycle is not applicable to NB-IoT.

N: min(T, nB)

Ns: max(1, nB/T)

Nn: number of paging narrowbands provided in system information

UE_ID: identity of the UE

IMSI mod 1024, if P-RNTI is scrambled on PDCCH

IMSI mod 4096, if P-RNTI is scrambled on NPDCCH

IMSI mod 16384, if P-RNTI is scrambled on MPDCCH or P-RNTI is scrambled on NPDCCH and the UE supports the reception of a paging message on a non-anchor carrier, and if configuration information of the paging message for the non-anchor carrier is provided in system information.

maxPagingCarriers: number of configured paging carriers provided in system information Weight(i): weight for NB-IoT paging carrier i The IMSI is a sequence of decimal numbers (0 . . . 9) and interpreted in the formulas as a decimal integer number, where the first digit is the highest order digit, and so on. For example, IMSI=12 (digit 1=1, digit 2=2), which is interpreted as a decimal number "12", not "1*16+2=18" in the calculations.

WUS in R15

In the 3GPP Rel-14 standard specification, for the UE staying in an idle mode, use of the paging scheme may reduce the power consumption of the UE. When the channel state of the UE is not good and coverage enhancement needs to be used, a PDCCH and/or a PDSCH needs to be repeatedly transmitted, such that the UE can correctly receive information from the base station or correctly transmit information to the base station. Before detecting a paging message, the UE needs to wake up from a sleep state to detect whether its own paging message is in each PO. Most of the time, the UE does not have a paging message. Therefore, when the UE stays in a coverage enhancement state, it needs to repeatedly receive the PDCCH or PDSCH multiple times to detect whether its own paging message is present. However, most of the time, the UE does not have its own paging message. Therefore, the UE consumes a significant amount of power. For MTC or NB-IoT users, it is extremely important to reduce power consumption of the UE. Therefore, in the 3GPP Rel-15 standard specification, the WUS is introduced for the UE staying in an idle state. The physical wake-up signaling WUS is monitored before a page message is detected in each PO. If the UE detects the WUS, it detects a paging message in a subsequent PO, such that it detects a PDCCH scrambled with P-RNTI and/or receives a PDSCH scheduled by the PDCCH. If the UE does not detect the WUS, it does not detect a paging message in a subsequent PO and goes directly back to the sleep state.

In order to further reduce power consumption of the UE, the UE grouping-based physical wake-up signaling (UE-group WUS) may be introduced. For example, UEs corresponding to a certain PO may be divided into several groups, and a certain group or multiple groups of UEs use one WUS. One UE may be configured or associated with multiple WUSs, including one or more common WUSs, one or more group WUSs, and one or more group combination WUSs. In a system supporting a UE grouping-based WUS, a common WUS and a group combination WUS are optional, such that the UE may not be configured with these two types of WUS. A common WUS refers to a WUS that may be used to wake up all groups of UEs monitoring the same WUS time-frequency resource (and possibly the same PO). A group WUS refers to a WUS that may only wake up a certain group of UEs. A group combination WUS refers to a WUS that may wake up multiple groups of UEs monitoring the same WUS time-frequency resource (and possibly the same PO), and the number of the multiple groups of UEs is a subset of all groups of UEs.

The multiplexing between the group WUSs, between the group WUS and the common WUS, or between the group WUS and the group combination WUS may be time division multiplexing (TDM), frequency division multiplexing (FDM), code division multiplexing (CDM), FDM+TDM, FDM+CDM, TDM+CDM or FDM+TDM+CDM. The multiplexing scheme may have a separate configuration or the same configuration made by the base station according to the network operation environment.

The FDM is based on one or more physical resource blocks (PRBs) as a unit for performing multiplexing. Alternatively, the FDM is based on one or more subcarriers as a unit for performing multiplexing.

The TDM is based on one or more orthogonal frequency division multiplexing (OFDM) symbols as a unit for performing multiplexing. Alternatively, the TDM is based on one or more subframes as a unit for performing multiplexing. Alternatively, the TDM is based on one or more radio frames as a unit for performing multiplexing. Alternatively, the TDM is based on one or more DRX cycles as a unit for performing multiplexing. Alternatively, the TDM is based on one or more enhanced DRX (eDRX) cycles as a unit for performing multiplexing.

The CDM is based on different basic sequences for performing multiplexing. Alternatively, the CDM is based on different cover codes of the same basic sequence for performing multiplexing. The cover codes may include frequency-domain cover codes or time-domain cover codes. For example, with 12 subcarriers in one PRB, 12 orthogonal cover codes may be generated. Alternatively, the cover codes may be generated based on OFDM symbols in the time domain. When the CDM scheme is adopted, there are two transmission modes: one is a mode in which only one code (one basic sequence or one cover code, also referred to as a single-sequence CDM) is transmitted at a certain time, and the other is a mode in which multiple codes (basic sequences or cover codes) are transmitted at a certain time.

The disclosed configurations may be implemented by system information, UE-specific RRC signaling, MAC signaling, or physical layer signaling.

For example, it is assumed that the WUS configuration may include the following configurations: the number of groups is 4, the group WUSs corresponding to each group (G1, G2, G3, and G4) are identified by GWUS1, GWUS2, GWUS3, and GWUS4; the WUSs configured for group combinations may be identified as GWUS5, GWUS6, and GWUS7 that correspond to G1+G2 group combination, G3+G4 group combination, and G2+G3 group combination, respectively; and a common WUS is GWUS8. If it is assumed that the UE determines that it is in group 2 (G2) according to WUS grouping criteria (e.g., based on the UE identity), then the UE is associated with multiple WUSs, including GWUS8, GWUS2, GWUS5, and GWUS7. Therefore, in a certain PO, the UE needs to monitor four WUSs (GWUS8, GWUS2, GWUS5, and GWUS7).

However, in one system, in addition to a UE that supports UE grouping-based WUS, there may be another UE that does not support UE grouping-based WUS, such as a UE that only supports the conventional R15 WUS and a UE that does not support WUS. In this case, when a base station sends a paging message to a UE over an air interface, it needs to know whether the UE supports UE grouping-based WUS to determine whether to use UE grouping-based WUS for performing a paging procedure. However, currently, the base station does not store the context and capability information of the UE in an RRC idle state or an RRC inactive state, and cannot obtain information related to whether the UE supports UE grouping-based WUS.

The following embodiments of the present disclosure provide solutions to the problems of how to reduce the amount of monitoring of the WUS in order to further reduce energy consumption of the UE caused when the UE is associated with a plurality of WUSs, and how to obtain the information related to whether the UE supports UE grouping-based WUS when the base station performs a paging procedure over the air interface. Through the disclosed methods in embodiments 1 and 2, the UE reduces the amount of monitoring of the WUS and energy consumption of the UE caused thereby. Through the method described in embodiment 3, the base station may know whether the UE supports UE grouping-based WUS, and determine whether to use UE grouping-based WUS to send a paging message in a paging procedure for the UE.

Embodiment 1

FIG. 1 illustrates a flowchart of a method executed by a user equipment according to Embodiment 1 of the present disclosure.

As illustrated in FIG. 1, in step 101, a UE receives UE grouping-based WUS configuration information from a base station. Preferably, the configuration information is included in system information.

In step 103, the UE supporting a UE grouping-based WUS function determines a UE group to which the UE belongs (that is, determines which UE group (group number) to which the UE belongs) and a WUS associated with the UE group, and monitors the associated WUS.

In step 105, in a case that the UE group of the UE is associated with more than one WUS (which may include a group WUS for the UE group, a common WUS, a group combination WUS, etc.), if the UE has successfully monitored one associated WUS for a particular PO, the UE stops monitoring other associated WUS(s). The expression that the UE stops monitoring other associated WUS(s) means that the UE stops monitoring associated WUS(s) for the PO or before receiving a paging message. The expression that the UE has successfully monitored one associated WUS means that the UE has successfully decoded one WUS with which the UE group is associated.

In a case that the UE supports grouping-based WUS, and the received system information or dedicated RRC message includes grouping-based WUS configuration information, the UE continues to monitor all associated WUSs for a specific PO until it successfully receives one associated WUS. Even if a plurality of WUSs are associated with the UE, after successfully receiving one WUS, the UE may determine that there will be a paging message in a subsequent PO, such that the UE does not need to monitor other associated WUS(s), thereby avoiding energy consumption caused by unnecessary monitoring.

Embodiment 2

Figure 2:
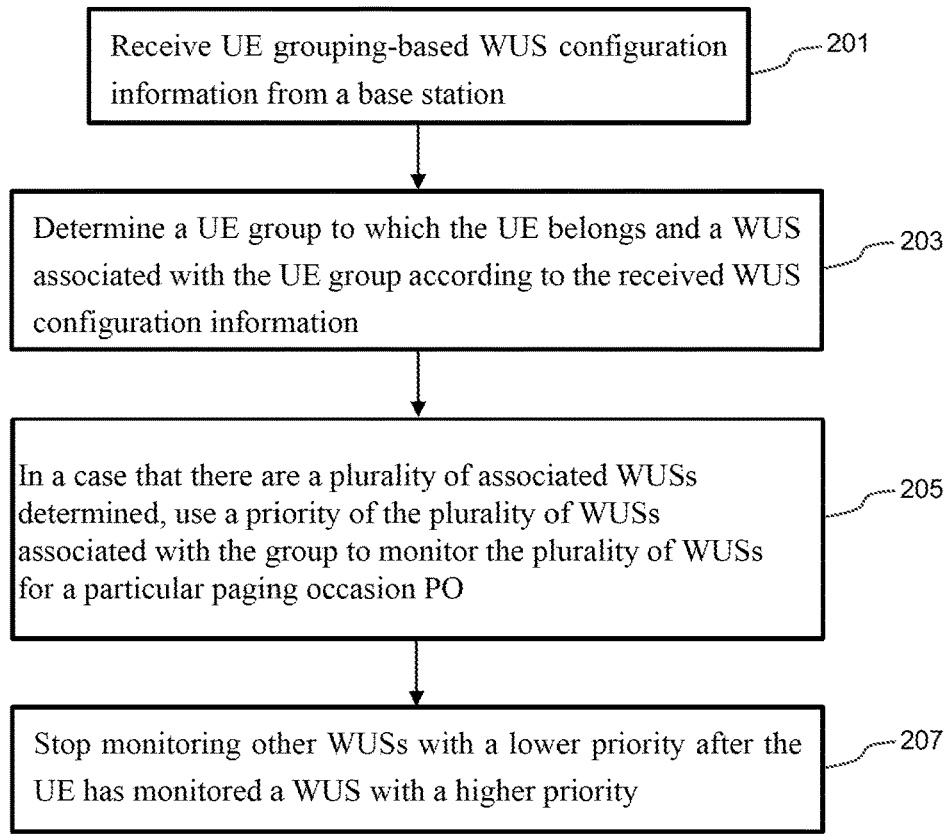
FIG. 2 illustrates a flowchart of a method executed by a user equipment according to an embodiment of the present disclosure.

FIG. 2 illustrates a flowchart of a method executed by a user equipment according to Embodiment 2 of the present disclosure.

Embodiment 2 is expected to achieve the same effect as Embodiment 1 in a different manner.

As illustrated in FIG. 2, in step 201, a UE receives UE grouping-based WUS configuration information from a base station. Preferably, the configuration information is included in system information.

In step 203, the UE supporting a UE grouping-based WUS function determines a UE group of the UE (that is, determines to which UE group (group number) the UE belongs) and a WUS associated with the UE group, and monitors the associated WUS.

In step 205, if the UE group of the UE is associated with more than one WUS (which may include a group WUS for the UE group, a common WUS, a group combination WUS, etc.), the UE may use the following order (priority) to monitor a plurality of WUSs for a particular paging occasion PO.

1. Common WUS
2. Group combination WUS
3. Group WUS.

If there are a plurality of group combination WUSs associated with the UE, the UE may perform monitoring according to the order of the numbers of groups corresponding to the group combination WUSs from more to less, and if the numbers of groups corresponding to the group combination WUSs are the same, the UE may randomly determine the order for performing monitoring.

For example, it is assumed that the WUS configuration may include the following configurations: the number of groups is 4, the group WUSs corresponding to each group (group 1 (G1), group 2 (G2), group 3 (G3), and group 4 (G4)) are identified by GWUS1, GWUS2, GWUS3, and GWUS4; the WUSs configured for group combinations may be identified as GWUS5, GWUS6, and GWUS7 that correspond to G1+G2 group combination, G3+G4 group combination, and G1+G2+G3 group combination, respectively; and a common WUS is GWUS8. If it is assumed that the UE determines that it is in group 2 (G2) according to WUS grouping criteria (e.g., based on the UE identity), then the UE is associated with multiple WUSs, including GWUS8, GWUS2, GWUS5, and GWUS7. Therefore, in a certain PO, the UE needs to monitor four WUSs (GWUS8, GWUS2, GWUS5, and GWUS7). At this time, the order or priority followed by the UE to monitor WUSs is GWUS8, GWUS7, GWUS5 and GWUS2.

In step 207, similar to Embodiment 1, in a case that the UE monitors the WUSs according to the disclosed priority, after the UE has monitored a WUS with a higher priority, the UE stops monitoring other WUSs with a lower priority for the PO or before receiving a paging message.

Embodiment 3

Figure 3:
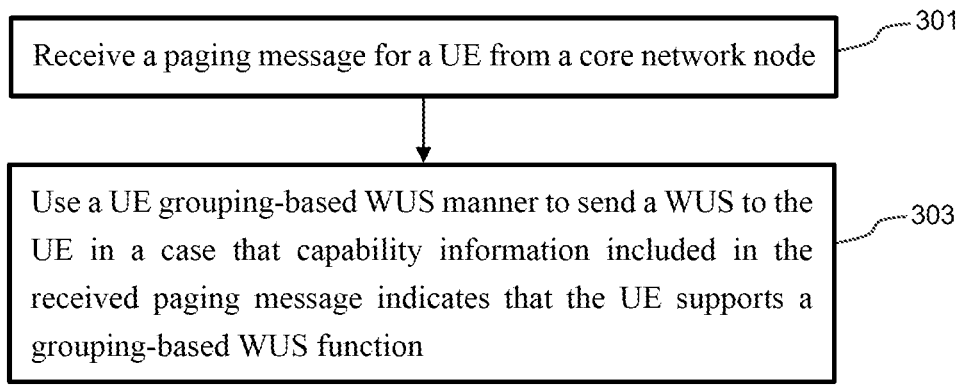
FIG. 3 illustrates a flowchart of a method executed by a base station according to an embodiment of the present disclosure.

FIG. 3 illustrates a flowchart of a method executed by a base station according to Embodiment 3 of the present disclosure.

Embodiment 3 provides a method for a base station to send a UE grouping-based paging message, with the method executed by the base station and a core network node (preferably a Mobility Management Entity).

As illustrated in FIG. 3, in step 301, a base station receives a paging message for a UE from a core network node. The paging message includes capability information indicating that (or whether) the UE supports a UE grouping-based WUS function. Preferably, the paging message is carried by an S1 Application Protocol (S1AP) message of the S1 interface.

In step 303, in a case that the capability information included in the received paging message indicates that the UE supports the grouping-based WUS function, if the base station also supports or enables the UE grouping-based WUS function (that is, system information includes a UE grouping-based WUS configuration), then the base station uses the UE grouping-based WUS manner to send a paging message in order to send a UE grouping-based WUS before sending a paging message. If the base station does not support or does not enable the UE grouping-based WUS function, the base station does not use a UE grouping-based WUS for sending a paging message.

Alternatively, the capability information indicating that the UE supports the grouping-based WUS may be independent capability information for a TDD system and a FDD system, respectively.

Embodiment 4

Figure 4:
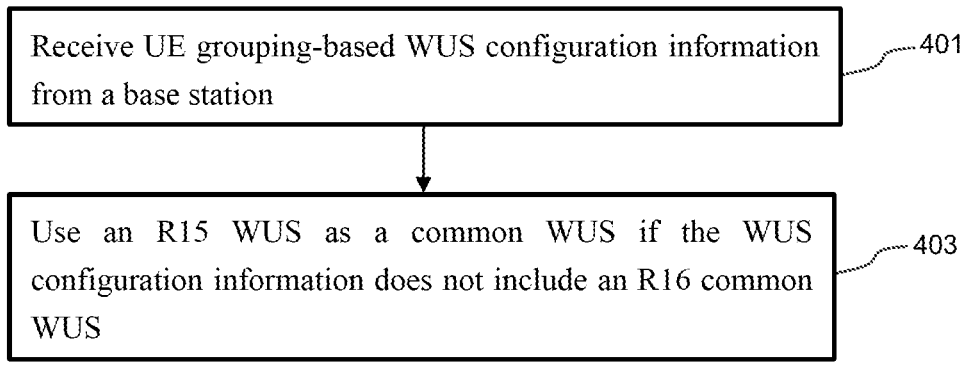
FIG. 4 illustrates a flowchart of a method executed by a user equipment according to an embodiment of the present disclosure.

FIG. 4 illustrates a flowchart of a method executed by a user equipment according to Embodiment 4 of the present disclosure.

Embodiment 4 provides a configuring manner for an R15 WUS and an R16 common WUS.

As illustrated in FIG. 4, in step 401, a UE receives UE grouping-based WUS configuration information from a base station. Preferably, the configuration information is included in system information.

In step 403, if the WUS configuration information does not include an R16 common WUS (that is, the information element for configuring the R16 common WUS does not exist), the UE uses the R15 WUS as a common WUS. Therefore, in this case, the UE uses the legacy R15 WUS (i.e., the WUS indicated by the wus-Config-r15 information element) as a common WUS by default. Preferably, when the time-frequency resource where the R15 WUS is located is the same as the time-frequency resource where the WUS corresponding to the UE group is located, the UE uses the legacy R15 WUS as a common WUS. Otherwise, if the WUS configuration information includes an R16 common WUS, the UE does not monitor the R15 WUS, and the UE ignores the received wus-Config-r15 information element.

Embodiment 5

Embodiment 5 provides a method for grouping UEs under a UE grouping-based WUS mechanism. In Embodiment 5, a service type, a service transmission (arrival) density, and a paging probability/frequency may replace each other.

In the current 3GPP discussions, it has been agreed to determine the manner for grouping UEs based on the UE identity (e.g., International Mobile Subscriber Identification Number (IMSI)). However, considering that different UEs, specifically different NB-IoT UEs, have different service characteristics and different probabilities (or frequencies) of being paged, grouping the UEs according to service types and/or paging probabilities may prevent the UE with less intensive services and/or low probability of being paged from being frequently woken up by a paging message/WUS used for a UE with more intensive services and/or a high probability of being paged to cause power consumption of the UE. Therefore, the present embodiment provides a method for realizing determination of grouping UEs based on services.

Different service types may be identified by using service type indications, and the different service types have different service transmission densities and/or paging probabilities. For example, service type indications 0 to 7 are used to indicate different service types, and the lower service type indication value indicates the lower service transmission density, or the higher service type indication value indicates the lower service transmission density. Alternatively, paging probability indications 0 to 2 are used to indicate the paging probabilities. The paging probability indication 0 indicates that the paging probability is low, the paging probability indication 1 indicates that the paging probability is medium, and the paging probability indication 2 indicates that the paging probability is high. Conversely, the paging probability indication 0 may indicate that the paging probability is high, the paging probability indication 1 may indicate that the paging probability is medium, and the paging probability indication 2 may indicate that the paging probability is low.

The WUS sequences corresponding to different paging probabilities may be scrambled by different paging probability indication values (e.g., paging probability indications 0 to 2), or the paging probability indication values may be used as parameters for generating the WUS sequences, such that the WUS sequences corresponding to different paging probabilities may be distinguished in a code domain, and the UE may monitor corresponding WUS sequences based on the determined paging probability corresponding to the UE itself. The WUS sequences corresponding to different paging probabilities may be distinguished in a time-frequency domain, which needs to be achieved by configuring the time-frequency domain resources of the WUSs corresponding to different paging probabilities through an RRC message, and the UE monitors the WUS in the time-frequency domain corresponding to the paging probability after receiving the above-mentioned configuration information and determining the paging probability corresponding to the UE itself.

The UE may calculate its paging probability indication by counting the number of times the UE is paged over a period of time. For example, within a period of time T, if the number of times the UE is paged is less than or equal to N0 times, then the paging probability of the UE is low, and the corresponding paging indication is 0 (or 2); if the number of times the UE is paged is less than or equal to N1 times and greater than or equal to N0 times, then the paging probability of the UE is medium, and the corresponding paging probability indication is 1; and if the number of times the UE is paged is greater than or equal to N1 times, then the paging probability of the UE is high, and the corresponding paging probability indication is 2 (or 0). The above-described threshold values N0 and N1 and/or the time T may be predefined or may be configured by the base station via an RRC message. The determination of the paging probability (indication) may be implemented at the UE RRC layer or at the UE non-access stratum (NAS) layer. The number of times the UE is paged may also be described as the number of times an RRC connection is established with the establishment cause that is "mobile terminated access".

The UE may report the determined paging probability (indication) to the base station through an uplink message, and then the base station delivers the paging probability to a core network node, and the core network node may store the paging probability. After the uplink message from the UE arrives, the core network node sends an S1AP paging message of the UE to the base station, where the S1AP paging message carries the stored paging probability. In this way, the base station may obtain a paging probability message corresponding to the UE from the core network node before sending paging information over the air interface, and then select a corresponding WUS sequence or a WUS resource to send a WUS based on the obtained paging probability message.

Considering that the paging probability (indication) of the UE may vary over the time, the paging probability used by the UE to determine its UE group uses the most recently obtained paging probability (indication) value, or, in other words, uses the paging probability (indication) value that is most recently reported to the base station. Preferably, for reporting the paging probability (indication) value of the UE, the UE is triggered to report the measured paging probability (indication) value to the base station or the network side only when the UE does not send the paging probability (indication) value to the base station in one RRC connection, or when the paging probability (indication) of the UE is changed from the last value reported by the UE.

The paging probability (indication) value may not be measured by the UE, but determined by a core network node, such as a Mobility Management Entity (MME), based on UE subscription information or service attributes. As previously disclosed, the base station may obtain paging probability (indication) value information from the core network node through the paging probability (indication) value included in the paging message, and use the paging probability (indication) value information to transmit the WUS or the paging message over the air interface. The UE may obtain the paging probability (indication) value directly through a NAS message sent by the core network node, or may obtain the paging probability (indication) value through an RRC message including information forwarded by the base station from the core network node. Alternatively, a corresponding relationship between the paging probability (indication) value and a service may be predefined, and the UE may determine its corresponding paging probability (indication) value based on a service it supports or a service that is running.

The paging probability/frequency (service type or service transmission (arrival) density) may also be replaced with a quality-of-service class identifier (QCI). The QCI is a scalar used to identify a particular treatment used by one more service data flow. When the UE has a plurality of services performed simultaneously, the UE corresponds to a plurality of QCIs, and the QCI for the previously disclosed UE group at this time uses a value corresponding to the QCI with the highest priority among the plurality of QCI values of the services performed in the UE.

Figure 5:
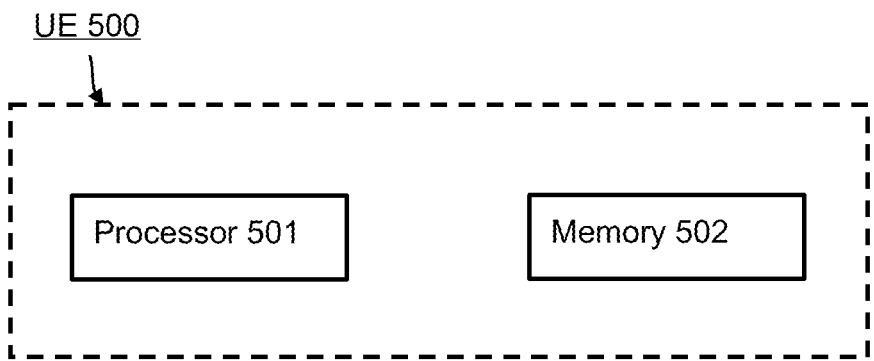
FIG. 5 illustrates a block diagram of a user equipment UE according to an embodiment of the present disclosure.

FIG. 5 illustrates a block diagram of a user equipment UE according to an embodiment of the present disclosure. As illustrated in FIG. 5, the user equipment UE 500 includes a processor 501 and a memory 502. The processor 501 may include, for example, a microprocessor, a microcontroller, an embedded processor, or the like. The memory 502 may include, for example, a volatile memory (e.g., random access memory (RAM)), a hard disk drive (HDD), a non-volatile memory (e.g., flash memory), or other memory. The memory 502 stores program instructions. The instructions, when executed by the processor 501, may perform the disclosed methods executed by the user equipment.

Figure 6:
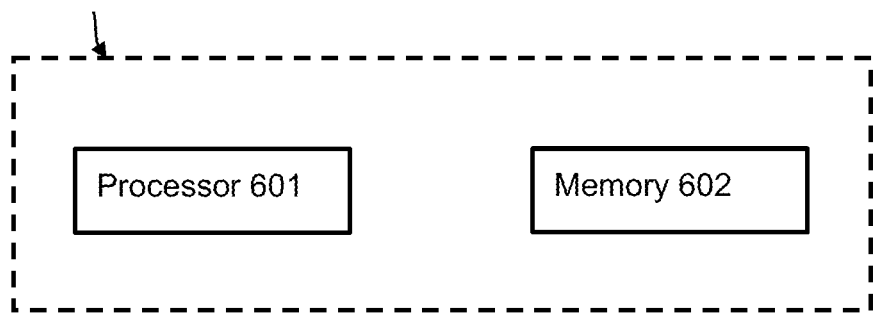
FIG. 6 illustrates a block diagram of a base station according to an embodiment of the present disclosure.

FIG. 6 illustrates a block diagram of a base station according to one embodiment of the present disclosure. As illustrated in FIG. 6, the base station 600 includes a processor 601 and a memory 602. The processor 601 may include, for example, a microprocessor, a microcontroller, an embedded processor, or the like. The memory 602 may include, for example, a volatile memory (e.g., random access memory (RAM)), a hard disk drive (HDD), a non-volatile memory (e.g., flash memory), or other memory. The memory 602 stores program instructions. The instructions, when executed by the processor 601, may perform the disclosed methods executed by the base station.

The program running on equipment according to the present disclosure may be a program that enables a computer to implement the disclosed functions by controlling a central processing unit (CPU). The program or information processed by the program may be temporarily stored in a volatile memory (e.g., random access memory (RAM)), a hard disk drive (HDD), a non-volatile memory (e.g., flash memory), or other memory systems.

The program for implementing the disclosed functions may be recorded on a computer-readable recording medium. The corresponding functions may be achieved by causing a computer system to read programs recorded on the recording medium and execute the programs. The so-called "computer system" may be a computer system embedded in the equipment, and may include an operating system or hardware (e.g., peripheral devices). The "computer-readable recording medium" may be a semiconductor recording medium, an optical recording medium, a magnetic recording medium, a recording medium for dynamically storing programs for a short time, or any other recording medium readable by a computer.

The various features or functional modules of the device used in the disclosed embodiments may be implemented or performed by circuitry (e.g., a monolithic or multi-chip integrated circuit). Circuits designed to execute the disclosed functions may include general-purpose processors, digital signal processors (DSPs), application-specific integrated circuits (ASICs), field-programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge due to advances in semiconductor technology, the present disclosure may also be implemented using these new integrated circuit technologies.

Furthermore, the present disclosure is not limited to the disclosed embodiments. Although various examples of the embodiments have been disclosed, the present disclosure is not limited thereto. Fixed or non-mobile electronic equipment installed indoors or outdoors may be used as terminal equipment or communication equipment, such as AV equipment, kitchen equipment, cleaning equipment, air conditioners, office equipment, vending machines, and other household appliances.

The disclosed embodiments have been disclosed in detail with reference to the accompanying drawings. However, the specific structure is not limited to the disclosed embodiments, and the present disclosure also includes any design changes without departing from the spirit of the present disclosure. In addition, various modifications may be made to the present disclosure within the scope of the claims, and embodiments obtained by appropriately combining the technical means disclosed in different embodiments are also included in the technical scope of the present disclosure. In addition, components having the same effect in the disclosed embodiments may be substituted for each other.

What is claimed is:

1. A method performed by a user equipment (UE), the method comprising:
receiving a UE grouping-based wake-up signal (WUS) configuration from a base station;
determining, based on the UE supporting a UE grouping-based WUS function, a plurality of WUSs associated with a UE group to which the UE belongs based on the received UE grouping-based WUS configuration, wherein the plurality of WUSs includes a first WUS and a second WUS;
monitoring the plurality of WUSs based on priorities of the plurality of WUSs; and
skipping monitoring remaining WUSs of the plurality of WUSs after the UE successfully detects, for a paging occasion (PO), one of the first WUS and the second WUS, wherein:
priorities of the first WUS and the second WUS are arranged from high to low based on an order of numbers of groups corresponding to the first WUS and the second WUS being from high to low,
the first WUS is a common WUS or a group combination WUS,
the second WUS is a group WUS, and
the priority of the first WUS is higher than the priority of the second WUS.

2. The method of claim 1, wherein:
the UE grouping-based WUS configuration is included in system information.

3. The method of claim 1, further comprising:
determining whether to monitor a physical downlink control channel (PDCCH) scrambled by a Paging-Radio Network Temporary Identifier (P-RNTI) based on whether the UE successfully detects the one of the first WUS and the second WUS.

4. The method of claim 1, wherein:
the UE grouping-based WUS configuration is included in a dedicated radio resource control (RRC) message.

5. A method performed by a base station, the method comprising:
receiving a paging message for a user equipment (UE) from a core network node, the paging message including capability information for indicating whether the UE supports a UE grouping-based wake-up signal (WUS) function;
transmitting, to the UE, a UE grouping-based WUS configuration in a case that the capability information indicates that the UE supports the UE grouping-based WUS function; and
transmitting a WUS to the UE by using the UE grouping-based WUS function in a case that the capability information indicates that the UE supports the UE grouping-based WUS function,
wherein the UE grouping-based WUS configuration enables the UE to:
determine a plurality of WUSs associated with a UE group to which the UE belongs, wherein the plurality of WUSs includes a first WUS and a second WUS;
monitor the plurality of WUSs based on priorities of the plurality of WUSs; and skip monitoring remaining WUSs of the plurality of WUSs after the UE successfully detects, for a paging occasion (PO), one of the first WUS and the second WUS, wherein:

priorities of the first WUS and the second WUS are arranged from high to low based on an order of numbers of groups corresponding to the first WUS and the second WUS being from high to low, the first WUS is a common WUS or a group combination WUS, the second WUS is a group WUS, and the priority of the first WUS is higher than the priority of the second WUS.

6. The method of claim 5, wherein:

the core network node is a mobility management entity.

7. A user equipment (UE), comprising:

at least one processor; and at least one non-transitory computer-readable medium coupled to the at least one processor and storing one or more instructions that, when executed by the at least one processor, cause the UE to:

receive a UE grouping-based wake-up signal (WUS) configuration from a base station;

determine, based on the UE supporting a UE grouping-based WUS function, a plurality of WUSs associated with a UE group to which the UE belongs based on the received UE grouping-based WUS configuration, wherein the plurality of WUSs includes a first WUS and a second WUS;

monitor the plurality of WUSs based on priorities of the plurality of WUSs; and skip monitoring remaining WUSs of the plurality of WUSs after the UE successfully detects, for a paging occasion (PO), one of the first WUS and the second WUS, wherein:

priorities of the first WUS and the second WUS are arranged from high to low based on an order of numbers of groups corresponding to the first WUS and the second WUS being from high to low, the first WUS is a common WUS or a group combination WUS, the second WUS is a group WUS, and the priority of the first WUS is higher than the priority of the second WUS.

8. The UE of claim 7, wherein the one or more instructions, when executed by the at least one processor, further cause the UE to:

determine whether to monitor a physical downlink control channel (PDCCH) scrambled by a Paging-Radio Network Temporary Identifier (P-RNTI) based on whether the UE successfully detects the one of the first WUS and the second WUS.

9. The UE of claim 7, wherein:

the UE grouping-based WUS configuration is included in system information.

10. The UE of claim 7, wherein:

the UE grouping-based WUS configuration is included in a dedicated radio resource control (RRC) message.

* * * * *